(12) United States Patent
Lin et al.

(10) Patent No.: US 8,868,541 B2
(45) Date of Patent: Oct. 21, 2014

(54) SCHEDULING RESOURCE CRAWLS

(75) Inventors: Zhen Lin, Bellevue, WA (US); Keith Stevens, Tarzana, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 13/011,426

(22) Filed: Jan. 21, 2011

(65) Prior Publication Data
US 2013/0144858 A1  Jun. 6, 2013

(51) Int. Cl.
*G06F 17/30* (2006.01)
(52) U.S. Cl.
USPC .......................................................... 707/709
(58) Field of Classification Search
USPC .......................................................... 707/709
See application file for complete search history.

(56) References Cited

U.S. PATENT DOCUMENTS

| | | | | |
|---|---|---|---|---|
| 6,351,755 B1* | 2/2002 | Najork et al. | ............... | 715/206 |
| 7,599,920 B1* | 10/2009 | Fox et al. | ................ | 1/1 |
| 7,653,617 B2* | 1/2010 | Strohm et al. | ......... | 707/999.003 |
| 7,769,742 B1* | 8/2010 | Brawer et al. | ................. | 707/709 |
| 7,801,881 B1* | 9/2010 | Brawer et al. | ................. | 707/709 |
| 7,930,400 B1* | 4/2011 | Fox et al. | ................... | 709/226 |
| 8,032,518 B2* | 10/2011 | Fox et al. | ....................... | 707/713 |
| 8,037,054 B2* | 10/2011 | Brawer et al. | .................. | 707/709 |
| 8,037,055 B2* | 10/2011 | Brawer et al. | .................. | 707/709 |
| 8,078,974 B2* | 12/2011 | Adar et al. | ..................... | 715/745 |
| 8,156,227 B2* | 4/2012 | Fox et al. | ....................... | 709/226 |
| 8,234,266 B2* | 7/2012 | Strohm et al. | ................ | 707/709 |
| 2002/0013825 A1* | 1/2002 | Freivald et al. | ............... | 709/218 |
| 2007/0050338 A1* | 3/2007 | Strohm et al. | ..................... | 707/3 |
| 2007/0174440 A1* | 7/2007 | Brier et al. | ..................... | 709/223 |
| 2009/0249451 A1* | 10/2009 | Su et al. | ........................... | 726/5 |
| 2010/0077098 A1* | 3/2010 | Fox et al. | ....................... | 709/233 |
| 2010/0114946 A1* | 5/2010 | Kumar et al. | .................. | 707/770 |
| 2010/0125564 A1* | 5/2010 | Strohm et al. | ................ | 707/709 |
| 2010/0205168 A1* | 8/2010 | Yang et al. | ..................... | 707/709 |
| 2010/0262592 A1* | 10/2010 | Brawer et al. | ................. | 707/709 |
| 2010/0318508 A1* | 12/2010 | Brawer et al. | ................. | 707/709 |
| 2011/0179178 A1* | 7/2011 | Fox et al. | ....................... | 709/226 |
| 2012/0023091 A1* | 1/2012 | Fox et al. | ....................... | 707/709 |
| 2012/0036118 A1* | 2/2012 | Brawer et al. | ................. | 707/709 |
| 2012/0047444 A1* | 2/2012 | Adar et al. | ..................... | 715/745 |

* cited by examiner

*Primary Examiner* — Etienne Leroux
*Assistant Examiner* — Jared Bibbee
(74) *Attorney, Agent, or Firm* — Fish & Richardson P.C.

(57) ABSTRACT

Methods, systems, and apparatus, including computer programs encoded on a computer storage medium, for scheduling resource crawls. In one aspect, a framework is provided for scheduling resource crawls such that a crawl scheduler determines the health of a document, i.e., whether it can be crawled, the popularity of the document, and the frequency of "interesting," i.e., substantive, content changes, and based on this information, estimates an appropriate crawl interval for each web resource to improve crawl resource utilization.

17 Claims, 5 Drawing Sheets

SCHEDULING RESOURCE CRAWLS

BACKGROUND

This specification relates to scheduling resource crawls.

Having fixed or limited computing system resources (e.g., central processing unit time, memory space, and storage space) for crawling presents a challenge in keeping pace with the ever expanding web. In particular, balancing the allocation of crawl resources between web pages can sometimes lead to crawling some web pages more often than necessary (e.g., if the content has not changed), and crawling other web pages less often than necessary, and thus, contributing to a miss rate for content updates.

SUMMARY

A framework is provided for scheduling resource crawls such that a crawl scheduler determines the health of a document, i.e., whether it can be crawled, the popularity of the document, and the frequency of "interesting," i.e., substantive, content changes, and based on this information, estimates an appropriate crawl interval for each web resource to improve crawl resource utilization.

In general, one innovative aspect of the subject matter described in this specification can be embodied in methods that include the actions of crawling a plurality of resources multiple times to determine a respective change frequency for each resource wherein the change frequency is based at least partly on detected changes to the resource; associating one of a plurality of different groups with each of the resources based at least partly on the resource's respective change frequency, wherein each group corresponds to a plurality of unique crawling intervals within a time range for the group, and wherein each resource in the plurality resources will be crawled at least as frequently as specified by a maximum crawling interval for the respective group; and determining a subscription count for a first resource in the plurality of resources and, based at least partly on the subscription count, associating the first resource with a specific crawling interval for the associated group, wherein the first resource will be crawled with a frequency specified by the specific crawling interval or a lesser frequency. Other embodiments of this aspect include corresponding systems, apparatus, and computer programs, configured to perform the actions of the methods, encoded on computer storage devices.

These and other embodiments can each optionally include one or more of the following features. The detected changes can be one or more changes to a prominent section of a rendered version of the resource. The acts can include crawling the first resource with a crawl frequency less than or equal to the frequency specified by the specific crawling interval, such that the crawl frequency is based at least partly on whether previous crawl attempts were successful. The acts can include determining whether previous crawl attempts were successful, and based on a negative determination, crawling the first resource at a crawl frequency less than the frequency specified by the specific crawl interval. Crawling the plurality of resource multiple times to determine the respective change frequency for each resource can include: determining a difference in time between a detected change to the resource and a previously detected change to the resource; and calculating a rolling average based on the difference in time. The acts can include crawling the first resource with a crawl frequency less than or equal to the frequency specified by the specific crawling interval, such that the crawl frequency is based at least partly on whether a change to the first resource was detected in a previous crawl attempt, and, in some cases, can include determining an elapsed time since a previously detected change to the first resource, determining whether a change to the first resource was detected, and adjusting the crawl frequency to correspond to the elapsed time if no change was detected.

Particular embodiments of the subject matter described in this specification can be implemented so as to realize one or more of the following advantages. Given a multi-user system with limited computing system resources for crawling, the reallocation of computing system resources based on popularity may benefit the majority of users and improve system performance by minimizing stale content information and minimizing miss penalties for monitored web resources. In some instances, operating costs may be reduced and costly expenditures deferred by redistributing the available computing system resources based on interests or needs of a majority and characteristics of the web resources, including, for example, content update frequencies.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
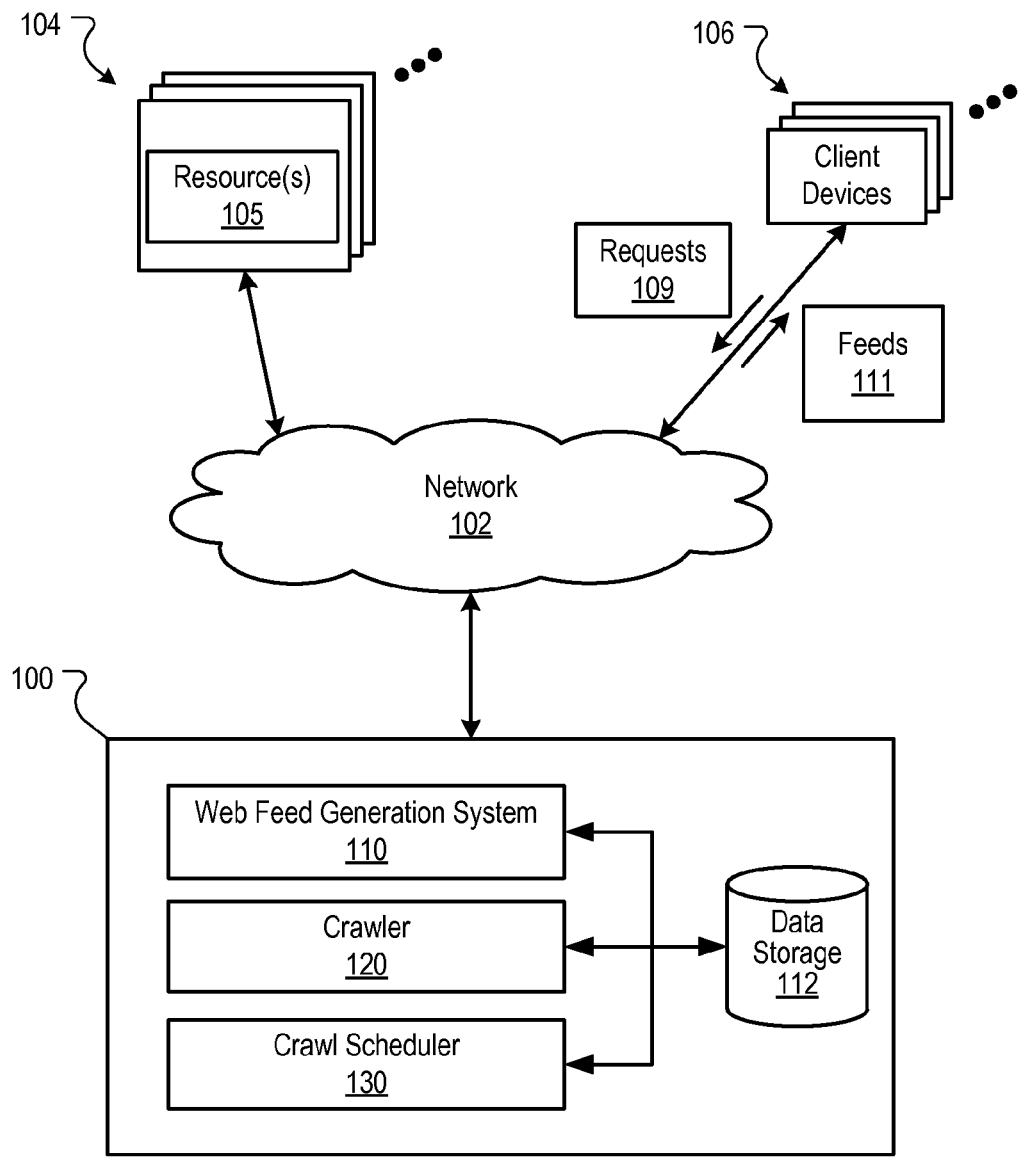
FIG. 1 is a block diagram illustrating an example web feed subscription system serviced by a crawl scheduler.

In general, information on the internet can be discovered by using "web crawlers" that, for example, follow links (also called hyperlinks) which connect one document, such as a web page or image file, to another. Crawled documents are typically downloaded and indexed for use by search engines and other applications, including, for example, web feed generation systems, as described below. Documents are typically re-crawled, for example, according to a crawl refresh policy, to monitor and refresh the downloaded content with updated information. Crawl refresh policies are typically designed to balance the need for refreshing collected information, and the number of documents that can be actively managed and maintained. For example, if a web crawler can process up to 2 million documents per hour and is configured to retrieve updated content every two hours, a maximum of four million documents could be retrieved and processed by the web crawler at a given time. However, if the refresh period is increased to every four hours, the number of documents that can be retrieved and processed by the web crawler may be doubled. However, the probability that the downloaded documents will become stale before the next crawl cycle may also increase. In some cases, the maximum number of documents that can be downloaded in a given time period may be reduced by expending resources to crawl inaccessible documents. Further, expending resources to refresh downloaded documents that are updated much less frequently unnecessarily limits the total number of documents that can be maintained by the web crawler.

As described herein, by monitoring the health of a document, i.e., whether it can be crawled, the popularity of the document, and the frequency of interesting, i.e., substantive, content changes, and using this information to estimate an appropriate crawl interval for each web resource, crawl resource utilization can be improved. In particular, prior to initiating a crawl request to a web crawler resource, a crawl resource scheduler determines the health or accessibility of the resource based upon stored data indicating the success of a prior crawl attempt. If the prior crawl attempt was successful, the web resource is determined to be healthy and a crawl request is issued to a web crawler. If the prior crawl attempt was unsuccessful, a determination is made as to whether to permanently discontinue attempts to crawl the web resource and/or whether to extend the crawl interval. In some implementations, an error count is maintained to limit the number of crawl attempts made after consecutive failures. In some cases, the error count is reset after a successful crawl attempt. Further, in some cases, the number of crawl attempts allowed after consecutive failures may depend on the cause or type of failure as indicated by the reply status returned by the web crawler after each crawl attempt (e.g., those attributable to external server issues such as Domain Name Service issues, time-outs, capacity limits).

In addition to monitoring the health of the web resource, the crawl resource scheduler determines an appropriate minimum crawl interval based on, for example, the popularity of the web resource. For example, in some implementations, the crawl interval is determined based on a subscription count (i.e., the number of web feed subscribers) for the web resource. Based on the subscription count, the web resource is associated with one of a number of ranges, or buckets, having an associated crawl interval. For example, web resources having a subscription count of 0 to 10 may be associated with a first bucket having an associated crawl interval of 30 minutes, while web resources having a subscription count of 11 or more may be associated with a second bucket having an associated crawl interval of 15 minutes. The policy may be extended by adding more buckets, and by scaling the crawl intervals associated with each bucket. In some implementations, each bucket is associated with a range of crawl intervals and web resources within each bucket are prioritized based on their corresponding subscription counts such that the shortest crawl intervals are allocated to the web resources having the highest subscription counts within the bucket. In this way, the available crawl resources can be utilized to service the largest number of subscribers at the least possible expense of missing updates to less popular web resources.

In some examples, the crawl rate for each resource is set to be inversely proportional to the web resource's subscription count such that as a web resource's subscription count increases, the crawl interval associated with the web resource follows a monotonically decreasing function, thereby resulting in increased crawl rates. Correspondingly, as a web resource's subscription count decreases, the crawl rate of the web resource decreases.

As described above, the utilization of crawl resources is also improved by determining an appropriate crawl interval based on the frequency of interesting content changes, for example, based on whether a web feed is generated by a web feed generation system as described below. In some implementations, the minimum crawl interval, as determined based a web resource's popularity, is modified or increased to correspond to the frequency of interesting content changes to the web resource. For example, in some implementations, a web resource may be reprioritized within the bucket if the crawl rate allocated based on popularity is significantly different from the frequency of interesting content changes to the web resource. In further implementations, only web resources within buckets having the smallest craw intervals, and therefore, the highest cost in terms of crawl resources, are reprioritized. In some implementations, web resources may first be prioritized based on the frequency of interesting content changes to the web resource. Then, web resources having an allocated crawl interval greater than one-half of the corresponding change frequency are promoted once for every web resource having a shorter crawl interval and a lower popularity score, until either the shortest crawl interval in the bucket is allocated to the web resource or the allocated crawl interval is no longer greater than one-half of the corresponding change frequency. In some cases, a web resource may be reassigned to another bucket if the change rate is significantly different from the available crawl rates within the bucket. For example, if a web resource's change rate is significantly higher than the available crawl rates, such as a change rate of every hour and a bucket having a crawl rate range of once a day to once every 2 days, then the web resource is bumped into a higher priority bucket and scaled accordingly. In this way, crawl intervals based on popularity are counter balanced by the frequency if an interesting content change is detected to improve crawl resource utilization while avoiding an unnecessary increase in the probability that less popular web resources will go stale before the next crawl.

In the description below, for the purposes of explanation, specific examples related to scheduling web resource crawls for a web feed generation system have been set forth in order to provide a thorough understanding of the implementations of the subject matter described in this specification. It is appreciated that the implementations described herein can be utilized in other capacities as well and need not be limited to web feeds or web resources. For example, implementations may be used to refresh databases and indexes, or for other types of resources, including, for example, word processing documents, portable document format (PDF) documents, images, and videos. Accordingly, other implementations are within the scope of the claims.

FIG. 1 is a block diagram illustrating an example web resource system 100 including software components: a web feed generation system (WFGS) 110, a crawler 120, and a crawl scheduler 130. WFGS 110 generates web feeds 111 for client devices 106 based on requests 109, e.g., subscription requests identifying a web resource 105 to be monitored for content changes. A network 102, e.g., the Internet, connects websites 104, client devices 106, and system 100.

Websites 104 include one or more web resources 105 associated with a domain name and hosted by one or more servers. An example website is a collection of web pages formatted in hypertext markup language (HTML) that can contain text, images, multimedia content, and programming elements, e.g., scripts. Each website 104, for example, is maintained by a publisher, e.g., an entity that manages and/or owns the website.

A web resource 105 is any data that can be provided by a website 104 or by a process such as an executing software program, for example, over the network 102 and that is associated with a web resource address such as a Uniform Resource Locator (URL), for instance. A web resource can be provided in one or more pieces (e.g., file fragments) or as a stream. Web resources 105 include HTML pages, eXtensible Markup Language (XML) documents, word processing documents, PDF documents, images, audio content, video, and feed sources, to name just a few. Web resources 105 can include content, e.g., words, phrases, and images and may include embedded information, e.g., meta information and hyperlinks or "links," and/or embedded instructions (e.g., JavaScript scripts).

A client device 106 is an electronic device capable of requesting and receiving web resources 105 over network 102. Example client devices 106 include personal computers, mobile communication devices, smart phones, tablet computers, server systems, and other devices that can send and receive data over network 102. Client device 106 typically includes a user application, e.g., a web browser, to facilitate the sending and receiving of data over network 102 and/or a web server application for re-publishing the data, e.g., for use by other client devices 106.

WFGS 110 identifies updated content in web resources 105 and generates a web feed 111 containing text snippets of the updated content. In some implementations, WFGS 110 is implemented such that only interesting content changes generate a web feed 111. Interesting content changes are detected, for example, by determining the importance of the web resource section containing the updated content. The importance of the section is based on one or more signals, including, for example, the prominence of the section within the rendered page layout in which the updated content is displayed. For example, in some implementations, visual layout information is determined, including, for example, the overall page width/height, section level width/height, whether the resource contains a prominent section, the ratio between regular text size and anchor text within the page, and for vertically aligned sections, the number of total columns, the width of each column, and each column's parameters (e.g., overall height of column, largest cell within the column). This information is then used to determine the relative importance of each section and/or the resource. For example, the ratio between regular text size and anchor text within a webpage is typically useful in distinguishing a portal page (where most of the page content consists of anchors) from a regular page (where most of the content consists of text/images). Further, a section having a section width greater than 50% of the overall page width and a section height greater than 50% of the overall page height indicates the section is a predominant section within the page and is, therefore, likely to be more important than a section having a much smaller height ratio located at the bottom of the page (e.g., a footer section).

Crawled web resources 105 are indexed and, optionally, cached in data storage 112. Data storage 112, or other storage, also stores information associated with each web resource, including, for example, information related to the number of subscription requests associated with the web resource (i.e., a subscription count), and information related to previous crawl attempts. In some implementations, the information related to previous crawl attempts includes, for example, the number of consecutive errors, and the N most recent crawl histories, where each crawl history includes the service status reply (e.g., an HTTP response status code such as error code "403-Forbidden" or "404-Not Found") received by crawler 120, and the length of time to complete a crawl request (e.g., from the time the web resource is first selected for processing until crawler 120 returns updated content or returns a failed status reply).

Web resources 105 are crawled by crawler 120 to retrieve updated content provided by web resource 105. The crawl policy for each web resource is determined by crawl scheduler 130 based on, for example, the crawl status of the web resource and an estimated crawl interval. In some implementations, the crawl status (e.g., Healthy, Dead, Temporarily Dead) is determined based on, for example, whether the most recent crawl attempt was successful, the number of failed attempts since the last successful crawl, and the cause of the failures. Further, in some cases, the next or new crawl interval is estimated based on, for example, the popularity of the web resource, the frequency of interesting changes to content provided by the web resource, and crawl status of the web resource.

Figure 2A:
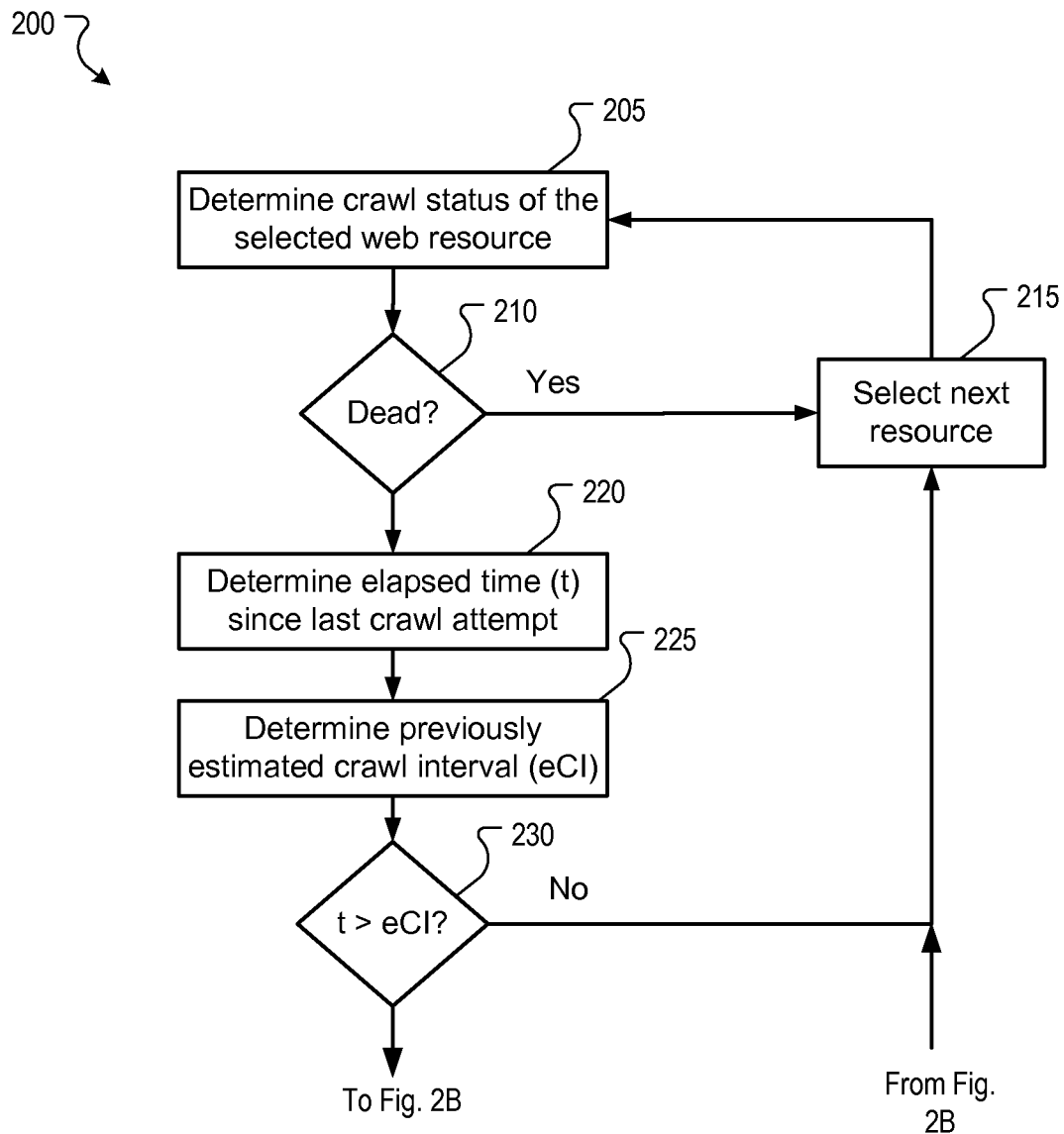
FIGS. 2A-2C are flow charts illustrating an example technique for managing crawl resources.
Figure 2B:
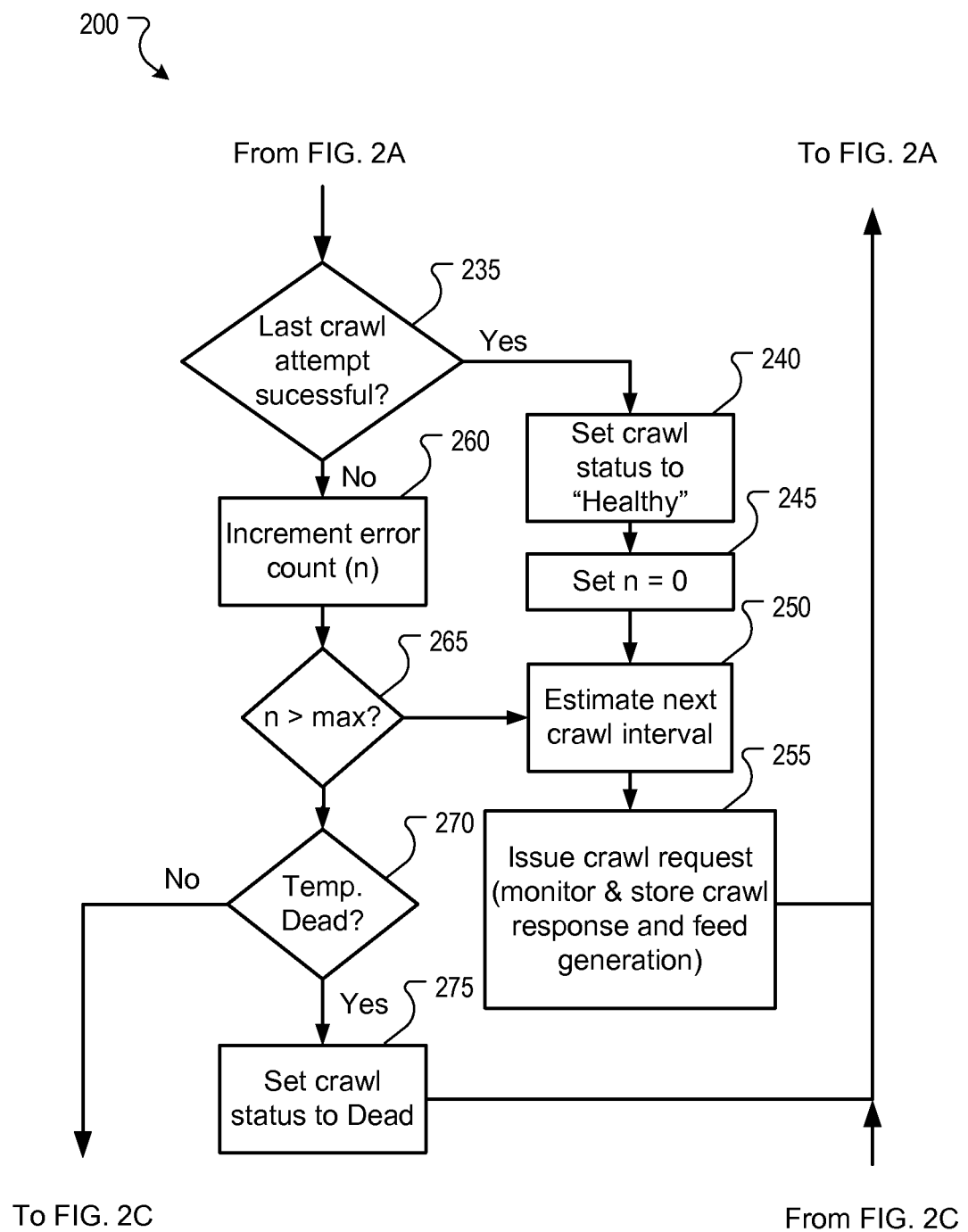
Figure 2C:
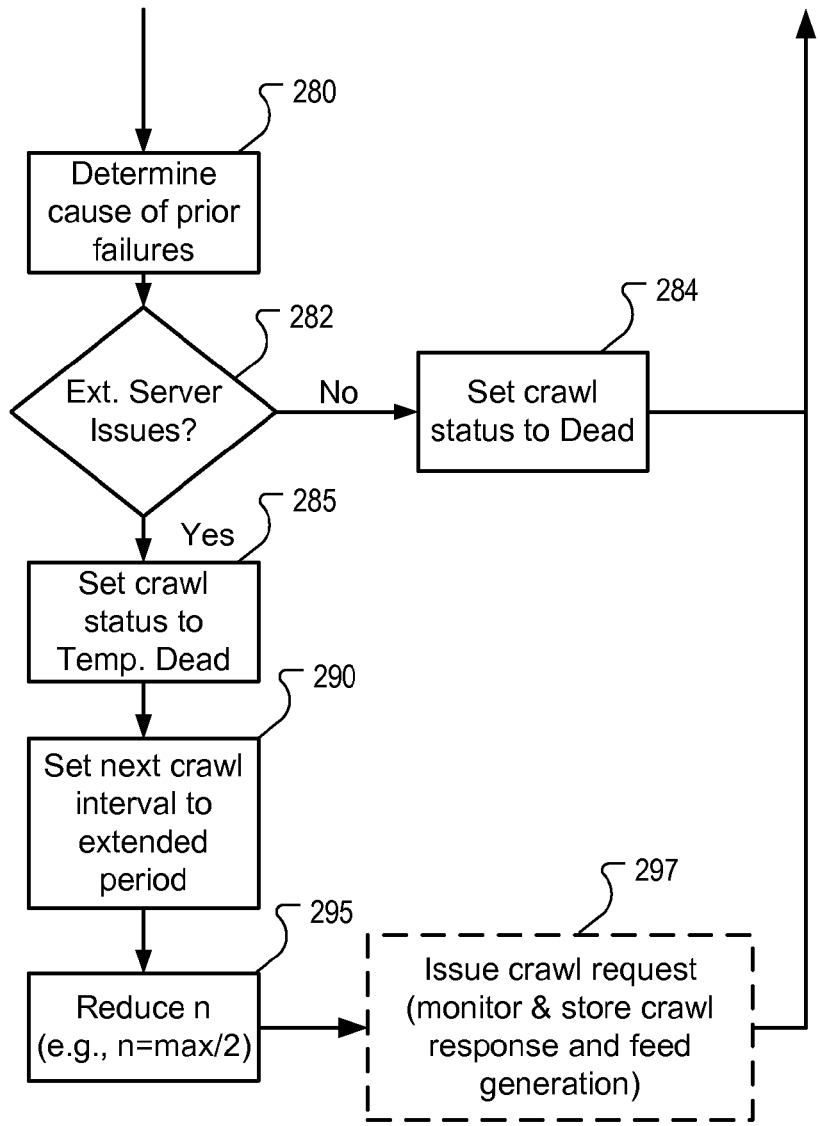

FIGS. 2A-2C illustrate an example technique for scheduling resource crawls. As illustrated, a crawl status for the selected web resource is determined (205) and if the crawl status is "Dead" (210), no further processing of the web resource is performed and the next web resource is selected (215). Otherwise, the previously estimated crawl interval is determined (e.g., by retrieving the information from data storage 112) and a determination is made as to whether a previously estimated crawl interval for the current web resource has elapsed. For example, as illustrated in FIG. 2A, the amount of time t that has elapsed since the last crawl attempt and the previously estimated crawl interval (eCI) are determined (220, 225) and compared (230). If t is not greater than (or, optionally, equal to) eCI, no further processing of the web resource is necessary and a determination is made with respect to the next web resource. Alternative techniques for determining whether the estimated crawl interval has elapsed may also be implemented, including, for example, comparing a current clock reference to an estimated clock time computed based on prior crawl history and the previously estimated crawl interval.

Once it is determined that the previously estimated crawl interval has elapsed, a determination is made as to whether the last crawl attempt was successful (235). If the determination is positive, the crawl status for the web resource is set to "Healthy" (240) and an error count n reflecting the number of failed crawl attempts since the last successful crawl is set to zero (245). In addition, a new crawl interval is estimated (250), for example, based on popularity, as described above, and a crawl request is issued for the web resource (255). If the crawl attempt is successful, updated content is retrieved, for example, by crawler 120, and is made available to WFGS 110 to determine whether there was an interesting change to the content provided by the web resource. If the crawl attempt fails, an indication of the failure and/or the cause or type of the failure is determined and recorded, for example, by monitoring the reply status returned from crawler 120 and storing a corresponding indicator in data storage 112, or other storage.

If, however, the last crawl attempt was unsuccessful, the error count n is incremented (260) and compared to a threshold representing a maximum number of allowed failures (max) (265). Alternative techniques for determining whether a threshold value has been met or exceeded may be used, including, for example, decrementing a number of allowed failed attempts each time a crawl attempt fails and comparing the value with a minimum threshold to determine if the threshold value has been exceeded or met. In general, if an alternative technique or criterion is used, the monitored value is modified such that it approaches the relevant limit or threshold.

As illustrated in FIG. 2B, if the comparison between n and max is negative, i.e., the maximum number of allowed failures has not been exceeded, the next crawl interval is estimated (250), for example, by extending the previous crawl interval, as described below, and a crawl request is issued for the web resource (255). If the comparison between n and max is positive (i.e., n>max), a determination is made as to whether the crawl status associated with the web resource is set to "Temporarily Dead" (270). If this determination is positive, the crawl status for the web resource is set to "Dead" (275), and no further processing of the web resource is performed. If, however, the comparison is negative, the cause or type of failure for at least one of the recent failed attempts is determined (280), e.g., by accessing the crawl history associated with the web resource and stored in, for example, data storage 112, and a determination is made as to whether one or more of the failures was due to external server issues (282), i.e., DNS issues, time outs, capacity limits. If this determination is negative, the crawl status for the web resource is set to "Dead" (284), and no further processing of the web resource is performed. If, however, this determination is positive, the crawl status for the web resource is set to "Temporarily Dead" (285) and the next crawl interval is set to an extended period of time (e.g., ten times the previous crawl interval, or some other value) (290). The extended period of time may be predetermined based on a system setting or dynamically determined based on a calculation or a recognized pattern or function. For example, in some implementations, the extended period of time is an integer multiple of the amount of time that has elapsed since the last successful crawl attempt (e.g., extended period of time=$n \times (t_{current} - t_{success})$, where $t_{current} - t_{success}$ is the amount of time that has elapsed since the last successful crawl attempt and n=1, 2, 3, . . . ). In further implementations, the crawl interval is increased by multiplying the previous crawl interval by a factor, e.g., 1.2, and the maximum number of attempts is set to 3.

In addition to setting the next crawl interval to the extended period of time, the number of failed attempts n is set to a value that will provide additional crawl attempts at a reasonable rate (e.g., 0, max/2, max−2, or some other value) before the crawl status for the web resource is set to "Dead." If, as discussed above, other criterion or techniques are used to determine if a limit related to crawl attempt failures has been reached or exceeded, n is modified such that one or more crawl attempts are carried out at a reasonable rate after the extended period of time has elapsed. In some implementations, a crawl request is also issued for the web resource (297) prior to selecting the next web resource. Otherwise, no further processing of the web resource is performed and the next web resource is selected.

In general, the techniques disclosed herein reduce the time a crawler spends crawling web resources that are not crawlable for any number of reasons, including, for example, the web resource being offline, the crawler being blocked by a robots.txt file, the crawler being rejected due to a capacity limit of web resource being reached, or various other issues. This may be achieved, for example, by determining an initial crawl rate (e.g., the fastest crawl rate allowed for a particular web resource), and modifying the crawl rate to optimize the use of crawl resources, for example, by assigning a new crawl rate after the previous crawl interval has elapsed in accordance with the popularity and/or change frequency of the web resource (i.e., the frequency at which interesting changes are made to the content provided by the web resource), as described above with respect to FIGS. 2A-2C.

In some cases, a crawl interval is assigned to the web resource, for example, based on the popularity of the web resource, for example, based on the number of users subscribing to a web feed for the web resource such that more popular web resources are deemed to be more important. For example, as described above, web resources having less than a threshold number of subscribers, e.g., less than 11 subscribers, may be assigned a crawl interval of 30 minutes, and web resources having more subscribers may be assigned a crawl interval of 15 minutes. Other signals may also be used to determine the popularity of the web resource or importance of the web resource to a group of users, and/or to modify such a determination, including, for example, available crawl capacity, available storage capacity, a probability of missing an interesting content change, an estimated frequency of interesting content changes, how often the generated web feed is viewed, and the amount of time required to process and crawl the web resource (e.g., based on past attempts).

In some implementations, the crawl interval is determined based on subscription counts for each web resource by associating the web resource with one of a number of bins, or buckets, each having one or more crawl intervals associated with it. In one example, web resources having 0 to 10 subscribers are assigned to a first bucket having an associated crawl interval of 30 minutes, and web resources having 11 or more subscribers are assigned to a bucket having an associated crawl interval of 15 minutes. In some cases, additional buckets are included. Further, in some examples, crawl intervals assigned to web resources within a bucket are scaled based on information associated with the corresponding web resource and a comparison of similar information associated with other web resources within the bucket. For example, in some instances, web resources within a bucket having a fixed range of crawl intervals are prioritized based on a corresponding subscription count such that web resources having higher subscription counts receive the shorter crawl intervals available within the bucket. Further, in some instances, web resources within a bucket are prioritized such that web resources having a higher change frequency are assigned the shorter crawl intervals within the bucket and web resources having a lower change frequency are assigned the longer crawl intervals. By prioritizing the web resource based on popularity (e.g., subscription counts), crawl resources may be used to satisfy the largest number of web feed subscribers, at the possible expense of missing interesting updates to less popular web resources.

In some examples, a web resource's crawl interval and priority within a bucket are based on a combination of signals, including, for example, subscription count and change frequency. For example, in some cases, if the change frequency of a web resource is significantly higher than the crawl rates available within the assigned bucket, the web resource is reassigned to another bucket. For example, if interesting changes are made to the content of a web resource at a rate twenty times faster than the fastest crawl rate available within the assigned bucket, the web resource is reassigned to a bucket having higher crawl rates and, in some implementations, is prioritized within that bucket based on the subscription count of the web resource, and/or other characteristics. Correspondingly, in some cases, web resources having high subscription counts and change frequencies that are significantly lower than the slowest crawl rates in the assigned bucket are reassigned to a bucket associated with crawl rates corresponding to the change frequency. In this way, crawl interval assignments based on popularity are counter balanced by the change frequency of the web resource such that crawl resources utilized by popular web resources having lower change frequencies can be reallocated to less popular web resources that are updated more frequently.

In some implementations, the crawl rate for each web resource is calculated based on the popularity of the web resource such that the estimated crawl interval is inversely proportional to the subscription count of the web resource. Thus, as a web resource gains more subscribers, its crawl interval decreases monotonically, resulting in higher crawl rates. Similarly, web resources with a decreasing viewing percentage are assigned longer crawl intervals, resulting in slower crawl rates.

Other techniques for determining the crawl interval include calculating the crawl interval based on linear and non-linear combinations of normalized and/or weighted signals such that the crawl interval is dependent on signals, such as, e.g., the error count (n), the subscription count, the frequency of interesting changes to the content provided by the web resource, and/or signals derived therefrom. Although the examples herein refer primarily to these signals in determining crawl intervals, other web resource characteristics may also be used, in lieu of, or in addition to these, including, for example, the last time a user subscribed for feeds for the web resource, the percentage of subscribers that view the feed generated for the web resource, the number of page views for the web resource, or a combination of these.

In some implementations, the error count n is used in determining the initial crawl rates and/or in modifying the crawl rate. For example, in some instances, the estimated crawl interval is increased exponentially each time a crawl attempt fails until a maximum number of attempts or allowed failures is reached or exceeded (e.g., n>8). In other examples, web resources are assigned to bins having an assigned range of crawl intervals based, at least in part, on corresponding error counts.

As described above, some implementations utilize the change frequency of a web resource in determining the crawl interval. The change frequency refers to the frequency of (or interval between) interesting changes to the content provided by the web resource. The change frequency for a web resource is determined, for example, by monitoring whether a snippet is generated by WFGS 110 after updated content is retrieved by crawler 120 and if so, calculating the time interval since the last snippet was generated. In some examples, the change frequency (or an associated time interval) is stored, for example, in data storage 112, or other storage, and is used to calculate a rolling average of the amount of time between interesting changes. In some implementations, more weight is given to more recent time differences to appropriately reflect the change frequency of web resources which were dormant for a long period of time but then became highly active, and vis-a-versa. For example, if a page initially has a change rate of once an hour, but then sees no updates for 2 weeks, this extended period of no updates will extend the change rate to include a period of 2 weeks without change. If this lack of change continues, the change rate eventually becomes 2 weeks, or some other limit.

A rolling average provides a short term rough estimate of how frequently the page changes overall, and thus, enables the estimated change rate to converge upon the actual change rate of the web resource. For example, for portal pages which are typically updated regularly, the observed change rate is expected to converge to the actual change rate, modulo permitted crawling capacity. Other web resources might experience a more elaborate change rate life cycle, where first there are a frequency set of updates to the page and then changes taper off. Therefore, some implementations take into account additional details to obtain a more accurate, long term estimate, for example, by categorizing web resources into classes and estimating a template change rate for each class of web resources. By analyzing several web resources within the same category, a general function of this change is estimated and used to provide better convergence.

In some examples, one or more of the techniques described above are modified in view of having a fixed amount of crawl capacity available, where each web resource crawl uses some amount of a fixed resource. For example, in some implementations, the associated cost per unit time to crawl a web resource and an estimated miss rate for interesting updates is used in assigning crawl interval ranges to the multiple buckets/bins and criteria for categorizing web resources in to each of the buckets. By minimizing the cost, i.e., miss penalty per web resource x cost per time unit, for each category of web resources, more users are likely to be satisfied without missing interesting updates or over crawling.

Figure 3:
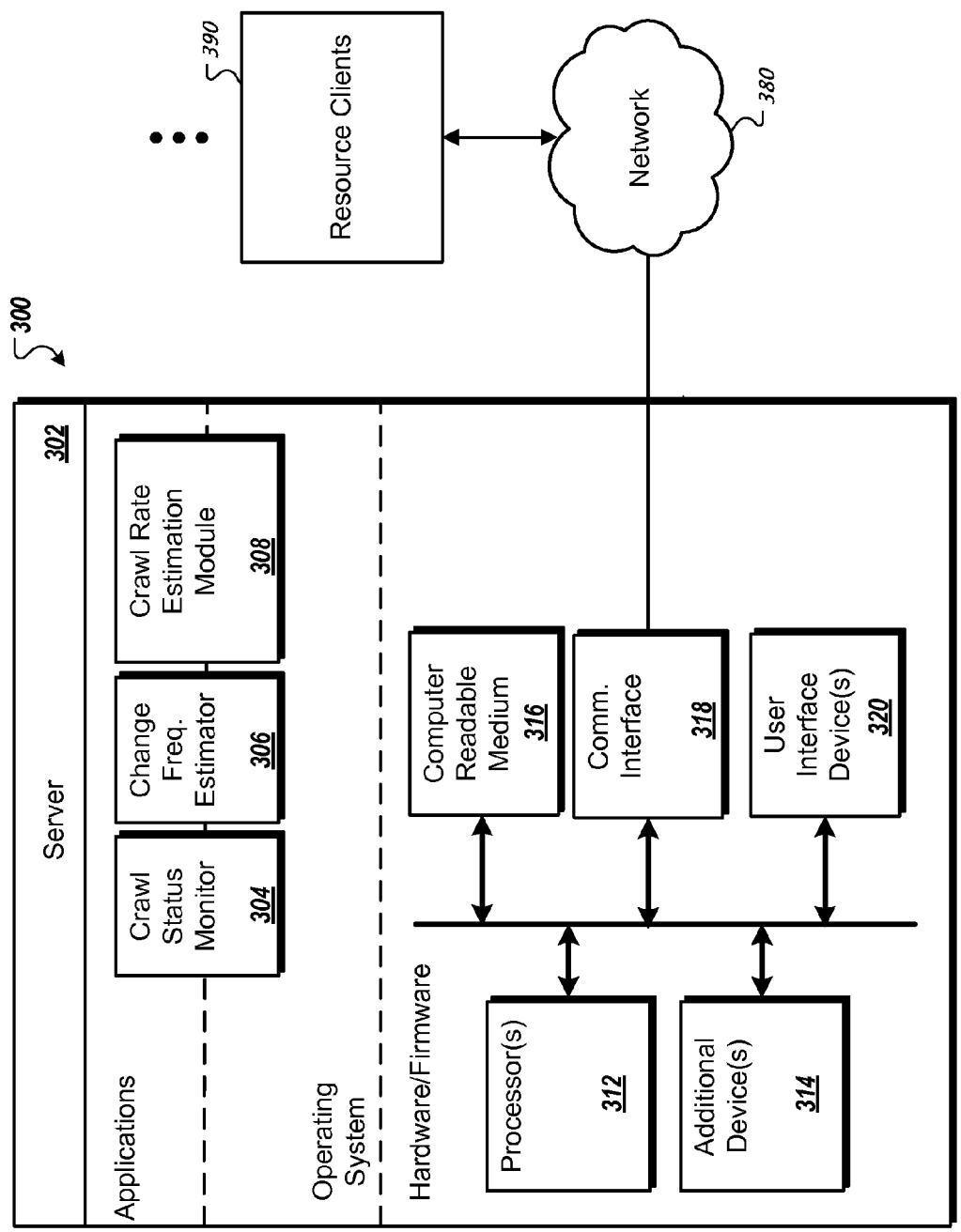
FIG. 3 is a block diagram of an example crawl scheduler.

FIG. 3 is a schematic diagram of an example crawl scheduler 300. The system generally consists of a server 302. The server 302 is optionally connected to one or more web resource clients 390 through a network 380. The server 302 consists of one or more data processing apparatus. While only one data processing apparatus is shown in FIG. 3, multiple data processing apparatus can be used. The server 302 includes various modules, e.g. executable software programs, including a crawl status monitor 304 for determining the health status of web resources, a change frequency estimator 306 for estimating the frequency of interesting changes to each web resource, and a crawl rate (or crawl interval) estimation module 308 for processing signals related to a web resource's health, crawl history, change rate, etc.

Each module runs as part of the operating system on the server 302, runs as an application on the server 302, or runs as part of the operating system and part of an application on the server 302, for instance. Although several software modules are illustrated, there may be fewer or more software modules. Moreover, the software modules can be distributed on one or more data processing apparatus connected by one or more networks or other suitable communication mediums.

The server 302 also includes hardware or firmware devices including one or more processors 312, one or more additional devices 314, a computer readable medium 316, a communication interface 318, and, optionally, one or more user interface devices 320. Each processor 312 is capable of processing instructions for execution within the server 302. In some implementations, the processor 312 is a single or multi-threaded processor. Each processor 312 is capable of processing instructions stored on the computer readable medium 316 or on a storage device such as one of the additional devices 314. The server 302 uses its communication interface 318 to communicate with one or more resource clients 390, for example, over a network 380. Examples of user interface devices 320 include a display, a camera, a speaker, a microphone, a tactile feedback device, a keyboard, and a mouse. The server 302 can store instructions that implement operations associated with the modules described above, for example, on the computer readable medium 316 or one or more additional devices 314, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
    crawling a plurality of resources multiple times;
    determining a respective prominent section for each resource based on, at least, visual dimensions of a rendering of the section;
    determining a respective change frequency for each resource, wherein the change frequency is based on, at least, detected changes to the respective prominent section of the resource;
    determining a crawl interval for each of the resources based on, at least, the respective change frequency of the resource, the crawl interval for each resource indicating a time between crawls of the resource; and
    for a first resource of the plurality of resources:
        determining that the crawl interval has elapsed,
        determining an error count of unsuccessful crawl attempts since a last successful crawl attempt does not exceed a maximum number of allowed failures, and
        in response to determining the error count does not exceed a maximum number of allowed failures, increasing the crawl interval of the first resource as a modified crawl interval based on an amount of time that has elapsed since a last successful crawl of the first resource.

2. The method of claim 1 wherein crawling the plurality of resources multiple times comprises:
    determining a respective difference in time between a detected change to each of the resources and a previously detected change to the resource; and
    calculating a respective rolling average for each of the resources based on the respective difference in time for the resource.

3. The method of claim 1 further comprising: reducing the respective crawl interval of a second resource based on whether a change to the second resource was detected in a previous crawl of the second resource.

4. The method of claim 1 further comprising increasing the respective crawl interval of a second resource based on whether a change to the second resource was detected in a previous crawl of the second resource.

5. A computer storage medium encoded with a computer program, the program comprising instructions that when executed by data processing apparatus cause the data processing apparatus to perform operations comprising:
    crawling a plurality of resources multiple times;
    determining a respective prominent section for each resource based on, at least, visual dimensions of a rendering of the section;
    determining a respective change frequency for each resource wherein the change frequency is based on, at least, detected changes to the respective prominent section of the resource;
    determining a crawl interval for each of the resources based on, at least, the respective change frequency of the resource, the crawl interval for each resource indicating a time between crawls of the resource; and
    for a first resource of the plurality of resources:
        determining that the crawl interval has elapsed,
        determining an error count of unsuccessful crawl attempts since a last successful crawl attempt does not exceed a maximum number of allowed failures, and
        in response to determining the error count does not exceed a maximum number of allowed failures, increasing the crawl interval of the first resource as a modified crawl interval based on an amount of time that has elapsed since a last successful crawl of the first resource.

6. The computer storage medium of claim 5 wherein crawling the plurality of resources multiple times comprises:
    determining a respective difference in time between a detected change to each of the resources and a previously detected change to the resource; and
    calculating a respective rolling average for each of the resources based on the respective difference in time for the resource.

7. The computer storage medium of claim 5 wherein the operations further comprise reducing the respective crawl interval of a second resource based on whether a change to the first second resource was detected in a previous crawl of the second resource.

8. The computer storage medium of claim 7 wherein the operations further comprise increasing the respective crawl interval of a second resource based on whether a change to the second resource was detected in a previous crawl of the second resource.

9. A system comprising:
    one or more computers operable to perform operations comprising:
        crawling a plurality of resources multiple times;
        determining a respective prominent section for each resource based on, at least, visual dimensions of a rendering of the section;
        determine a respective change frequency for each resource wherein the change frequency is based on, at least, detected changes to the respective prominent section of the resource;
        determining a crawl interval for each of the resources based on, at least, the respective change frequency of the resource, the crawl interval for each resource indicating a time between crawls of the resource; and
        for a first resource of the plurality of resources:
            determining that the crawl interval has elapsed,
            determining an error count of unsuccessful crawl attempts since a last successful crawl attempt does not exceed a maximum number of allowed failures, and
            in response to determining the error count does not exceed a maximum number of allowed failures, increasing the crawl interval of the first resource as a modified crawl interval based on an amount of time that has elapsed since a last successful crawl of the first resource.

10. The system of claim 9 wherein crawling the plurality of resource multiple times comprises:
   determining a respective difference in time between a detected change to each of the resources and a previously detected change to the resource; and
   calculating a respective rolling average for each of the resources based on the respective difference in time for the response.

11. The system of claim 9 wherein the operations further comprise reducing the respective interval of a second resource based on whether a change to the second resource was detected in a previous crawl of the second resource.

12. The system of claim 11 wherein the operations further comprise increasing the respective crawl interval of a second resource based on whether a change to the second resource was detected in a previous crawl of the second resource.

13. The method of claim 1 wherein increasing the crawling interval of the first resource based on an amount of time that has elapsed since a last successful crawl of the first resource comprises setting the crawling interval of the first resource to a product of the amount of time that has elapsed since the last successful crawl of the first resource and a factor.

14. The method of claim 1, further comprising:
   crawling one or more of the resources according to the respective crawl intervals of the resources.

15. The system of claim 9 wherein increasing the crawling interval of the first resource based on an amount of time that has elapsed since a last successful crawl of the first resource comprises setting the crawling interval of the first resource to a product of the amount of time that has elapsed since the last successful crawl of the first resource and a factor.

16. The system of claim 9, further comprising:
   crawling one or more of the resources according to the respective crawl intervals of the resources.

17. The method of claim 1, further comprising:
   for a second resource of the plurality of resources:
      determining that the crawl interval for the second resource has elapsed;
      determining an error count of unsuccessful crawl attempts since a last successful crawl attempt exceeds a maximum number of allowed failures; and
      in response to determining the error count exceeds a maximum number of allowed failures, determining whether to continue crawl attempts for the second resource.

* * * * *